United States Patent [19]
Devercelli

[11] Patent Number: 5,903,332
[45] Date of Patent: May 11, 1999

[54] INTERLOCKING HINGE FOR A SPECTACLE MOUNT

[76] Inventor: Pietro Devercelli, Via Poligonia, 90, 15100 Alessandria, Italy

[21] Appl. No.: 08/878,345

[22] Filed: Jun. 18, 1997

[30] Foreign Application Priority Data

Jun. 18, 1996 [IT] Italy .................................. TO96A0526

[51] Int. Cl.⁶ ....................................................... G02C 5/22
[52] U.S. Cl. ............................................. 351/153; 16/228
[58] Field of Search .............................. 351/110, 41, 153, 351/140, 111, 115, 116, 118, 119; 16/228

[56] References Cited

U.S. PATENT DOCUMENTS 5,073,020  12/1991  Lindberg et al. ......................... 351/106

FOREIGN PATENT DOCUMENTS

| 2281979 | 3/1995 | United Kingdom . |
| 9518985 | 7/1995 | WIPO . |
| 9602014 | 1/1996 | WIPO . |
| 9630799 | 10/1996 | WIPO . |

*Primary Examiner*—Hung Xuan Dang
*Attorney, Agent, or Firm*—Ladas & Parry

[57] ABSTRACT

A hinge, in particular for the lateral arms or the bridge of a metal wire, even rimless, spectacle mount; the hinge having a first portion defined by an end group of over one and a half (e.g. one and three-quarter) coils and formed by bending a first metal wire element of the mount, e.g. the connecting end of a lateral arm, and a second portion defined by a partially open toroid portion (at least one, even incomplete, coil or circle or ring portion) formed by bending one end of a second (fixed) metal wire element of the mount; the (partially open) coil or toroid portion of the second portion winding about an angle of over 180° and being engaged internally by the group of coils of the first portion to permit free relative rotation of the group of coils in both directions; the group of movable coils and the fixed coil (or vice versa, the movable coil and the fixed group of coils) acting as a screw-nut screw connection; the fixed coil at one end (with or without a straight portion) forming a stop surface for arresting rotation of the lateral arm beyond the closed position; the movable coils of the lateral arm terminating with a straight portion parallel or not (to determine an opening stop angle of other than 90°) to the lateral arm; and the straight portion cooperating as a stop surface with a branch of the mount to arrest rotation of the lateral arm in the fully open position.

9 Claims, 1 Drawing Sheet

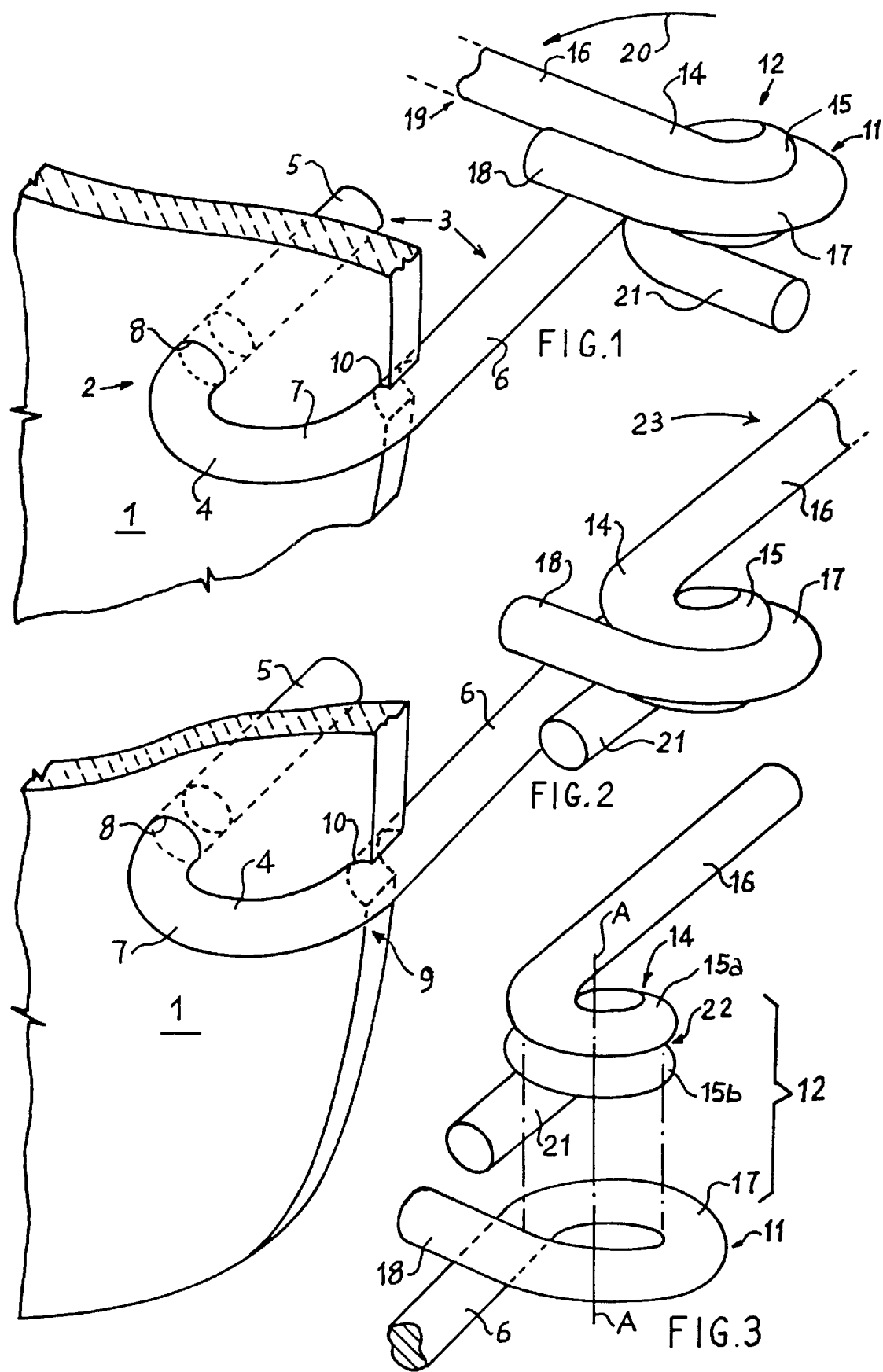

INTERLOCKING HINGE FOR A SPECTACLE MOUNT

BACKGROUND OF THE INVENTION

The present invention relates to a perfected hinge for a spectacle mount, and more specifically to a hinge which may be used to advantage to connect the lenses to the ear-pieces (temple assemblies or lateral arms) of a rimless spectacle mount, the elements of which are all or mostly made of highly elastic but permanently deformable wire material, such as metal wire, or of composite synthetic material (e.g. carbon fibers), and which comprises two lateral arms pivoting on respective hinges connected, even indirectly, to the lenses by respective bent wire portions, and a bridge also fitted elastically by bent wire portions to the lenses.

European Patent N. 256.098-B1 relates to a mount for spectacle lenses, made of metal wire and wherein the hinges of the lateral arms are each defined by a fixed straight portion connected to the lens by a bent wire portion and forming the hinge pin, and by a movable portion connected to the lateral arm and defined by a coiled wire portion pivoting about the fixed pin. The free end of the coiled wire portion defines a stop for arresting rotation of the coiled portion, and hence of the lateral arm, by contacting the bent wire portion; and the bent wire portion connecting the straight portion or fixed pin to the lens is bent twice by 90°, with the bends in planes perpendicular to each other, and continues towards the lens in the form of a U-shaped bend located in a normally vertical plane parallel to the fixed pin, and which is inserted elastically inside a respective opening formed close to the outer edge of the lens.

After fitting the lateral arm onto the fixed pin, this type of hinge involves mechanically bending the outer end of the pin to prevent withdrawal of the coiled portion, so that the hinge can no longer be broken down into its two component parts for repair or for combining different finish elements after production. Moreover, in the event the lateral arm is forced, e.g. knocked, open beyond its normal travel, the stop defined by the free end of the coiled portion of the lateral arm, and which is a definite obstacle to rotation of the arm, transmits the stress on the arm to the spectacles, thus resulting in serious damage to the mount and lenses. This type of hinge is therefore relatively fragile and complex in design, and it is extremely difficult to achieve precise slackfree mutual rotation of the hinge elements, combined with constant friction which may be adjusted as required over time.

SUMMARY OF THE INVENTION

It is an object of the present invention to provide a hinge made of metal wire, in particular for the lateral arms of spectacle mounts, but which may also be applied to the bridge for folding the spectacles, and which provides for eliminating the drawbacks of the known hinge described above More specifically, it is an object of the present invention to provide a hinge of more straightforward design, which provides for rapid assembly or disassembly of the finished lateral arms with no further mechanical operations required, which provides for highly precise rotation, and which, finally, enables the lateral arm to be rotated, exceptionally, beyond the opening stop without breaking, deforming or transmitting excessive bending stress to the lens or mount (astaflex® performance)

According to the present invention, there is provided a perfected hinge for a spectacle mount, in particular for connecting the lateral arms to the lenses, and wherein the mount is made of flexible, permanently deformable wire; said hinge comprising a first and a second portion independent of and connected in rotary manner to each other; and each said portion of the hinge being formed in one piece with a respective mount element by bending a corresponding end of the mount element;

characterized in that said first portion comprises at least one coil or toroid portion, and said second portion comprises a group of at least one and a half coils, which engages in relatively rotating manner said at least one coil or toroid portion of the first portion in the form of a screw-nut-screw connection.

BRIEF DESCRIPTION OF THE DRAWINGS

A preferred, non-limiting embodiment of the present invention will be described by way of example with reference to the accompanying drawings, in which:

FIG. 1 shows a partial, arbitrary-scale view in perspective of a hinge in accordance with the invention and as rotated when the lateral arms of the spectacles are closed;

FIG. 2 shows a view in perspective of the FIG. 1 hinge as rotated when the lateral arms of the spectacles are open;

FIG. 3 shows an exploded view of the fixed and movable portions of the FIG. 1 hinge.

DETAILED DESCRIPTION OF THE INVENTION

For the sake of simplicity, FIGS. 1 and 2 show a lateral end portion of a pair of spectacles, which is symmetrically and specularly identical to the other portion not shown. A portion of a lens 1 is shown in combination with a portion of a spectacle mount 3 or temple assembly including an endpiece 4, a lateral arm or temple 16 and an interconnecting hinge 12. Lens 1 is supported by a supporting element 2 forming part of a rimless spectacle mount 3 made entirely or partly of appropriately bent and shaped wire—in the example shown, metal wire, such as titanium alloy. Supporting element 2, which is fixed and integral with lens 1, comprises a bent wire portion bent into a substantially U-shaped bend 4 comprising two straight parallel branches or arms 5 and 6 joined at one end by a curved portion 7; branch 5 of bend 4 is fitted through a hole 8 formed in and close to a peripheral edge 9 of lens 1; and the other branch 6 extends outside the lens, and is pressed elastically against edge 9 in the form of an elastic grip for gripping the portion of the lens between hole 8 and edge 9.

To prevent lens 1 rotating about branch 5, a groove 10 may be formed in edge 9, at outer branch 6, and through which branch 6 extends.

Outer branch 6 is longer than branch 5 to define a fixed portion 11 of a hinge 12, in which rotates a movable portion 14 of the hinge. Movable portion 14 of hinge 12 comprises a helical winding defined by a group of coils 15 formed by permanently bending an end portion of a movable second element of mount 3, defined by one of the two wire lateral arms 16 of the spectacles. The end portion of lateral arm 16 is coiled with a predetermined diameter and with a winding axis A—A (FIG. 3) substantially perpendicular to lateral arm 16 (to be exact, the winding axis is inclined 9.08° with respect to the lateral arm).

Fixed portion 11 of hinge 12 comprises an end portion of branch 6 curving back on itself to form at least one open coil 17 or a portion of a circle, or, more generally, to form at least a coil or toroid portion winding by an angle of over 180° (preferably by an angle of 270°) about an axis coincident with the axis of rotation of lateral arm 16.

Though the preferred embodiment described comprises only one partial or incomplete coil 17, fixed portion 11 of hinge 12 may comprise a larger number of coils without impairing operation of the hinge or departing from the scope of the present invention. Likewise, group of coils 15 may comprise any number of coils, with a minimum of at least one and a half coils.

Coil 17—or at any rate the last coil in the event a number are provided—terminates with a short straight portion 18 perpendicular to branch 6 of mount 3, bent elastically to extend over branch 6, and which defines a stop (FIG. 2) for lateral arm 16 when this is rotated in the direction of arrow 20 into the closed position 19 substantially parallel to lens 1.

Said stop may also be formed, without recourse to straight portion 18, by simply cutting coil 17 at an appropriate angle to form a direct stop surface between lateral arm 16 and coil 17. Moreover, straight portion 18, to effectively arrest and prevent the closed lateral arm 16 from exceeding it, must not be tangent to branch 6—as it would be in the case of a 360° winding angle—but must project with play from branch 6 (coil interval) to better interfere with lateral arm 16. As such, straight portion 18 departs from the coiled portion with a rise angle of about 7.63° (function of the wire and coil diameters), and, even though extending straight, projects with play from branch 6 with no interference.

Though useful in preventing the lateral arm from contacting the lens, said stop for arresting the closed lateral arm is not indispensable, and may be eliminated by reducing the winding angle of coil 17, in which case, the pitch of coil 17 may also be eliminated. In fact, in the event straight portion 18 is provided for arresting the closed lateral arm, the pitch of coil 17 is determined by the position of straight portion 18 with respect to branch 6. Preferably, straight portion 18 is positioned across branch 6, either on the top side, as shown in FIGS. 1 and 2, or on the underside of branch 6, so that the pitch of coil 17 roughly equals the diameter of the wire from which it is made. Higher pitch values are possible, though the selected value, equal to the diameter of the wire, is the easiest to implement.

The elasticity of the material and the small winding angle of coil 17 also enable coil 17 to be formed with a zero pitch (i.e. in the form of a toroid portion), but on condition that only one coil 17 is provided, and that it is sufficiently open, and has no straight portion 18, which would otherwise interfere with branch 6.

Fixed coil 17 is so sized as to be connected concentrically and externally about group of coils 15, and more specifically to be housed in the groove defined by the space between coils 15, so as to ensure free mutual rotation, in both direction, of coil 17 and group of coils 15. Appropriately selecting the winding diameter of coils 15 in relation to that of coil 17 ensures a loose fit, i.e. with a small amount of interference, which, by virtue of the elasticity of the wire and that ensured by the helical winding of coils 15 and 17, provides for frictional rotation between lateral arm 16 and element 4 integral with the lens, with no risk of jamming due to excessive friction between the parts.

For the above conditions to be achieved, fixed coil 17 is preferably wound in the same direction and with substantially the same pitch as coils 15, so that fixed portion 11 and movable portion 14 of hinge 12 rotate mutually in the manner of a screw-nut screw connection, wherein coils 15 of lateral arm 16 represent the screw, and fixed coil 17 the nut screw. More specifically, the two portions of hinge 12 are so sized that fixed coil 17 occupies the outer helical groove 22 (FIG. 3) between two adjacent coils 15a, 15b of movable portion 14, and so that, during rotation, the inner surface of the wire of coil 17 slides on the outer surface of the wire of adjacent coils 15a, 15b.

This type of connection between movable portion 14 and fixed portion 11 of hinge 12 provides for more accurately hinging lateral arms 16 to mount 3 as compared with known solutions, by virtue of the lateral arms, as they rotate, being guided smoothly with substantially no slack, due to the increased size of the sliding contact surfaces as compared, for example, with a hinged joint defined by a group of coils wound about a fixed pin, as described in European Patent N. 256.098-B1.

Moreover, the connection, according to the present invention, between a group of movable coils formed from the wire at one end of the lateral arm, and one or more fixed coils formed from the wire of the mount (or vice versa) automatically provides for preventing axial withdrawal of the lateral arms from the mount, thus reducing the number of mechanical operations required to produce this type of connection, while at the same time enabling troublefree snap-on assembly, and equally troublefree disassembly If pushed beyond their normal predetermined travel, the lateral arms may still rotate, though with much more resistance, and either be safely reseated or disengaged from coil 17 if forced even further.

Coils 15 terminate with a straight portion 21 parallel to lateral arm 16 or at other angles, depending on the desired angle of rotation and the starting angle of lateral arm, and which defines a second stop for arresting rotation of lateral arm 16 beyond the fully open position 23 (FIG. 2) corresponding to the open position of the spectacles and wherein straight portion 21 is positioned parallel to and against branch 6 of mount 3.

As a function, therefore, of the position of straight end portion 18 of fixed coil 17 and straight end portion 21 of movable coils 15 of lateral arm 16, this may rotate by a predetermined angle (about 90° in the example shown) between the open position and the closed position 19 (FIG. 1) in which lateral arm 16 is substantially parallel to lenses 1.

Clearly, therefore, for the hinge according to the invention to function correctly, coil 17 and group of coils 15 may be formed indifferently on either element of the mount (the fixed element secured to the lens or the movable lateral arm). As such, a mount may be formed with hinges wherein the elements are inverted as compared with those described (coil 17 integral with lateral arm 16, and group of coils 15 formed in one piece with branch 6). Also, a dual connection as described may be formed between coils 15 and coil 17, i.e. with coils 15 engaging the outside as opposed to the inside of coil 17. Also, portion 21 (and portion 18) may obviously be made much shorter than as shown by way of example, e.g. so as to fall within a square with sides tangent to the outer surface of coils 15.

Finally, the hinge according to the invention may obviously be used, not only to connect the lateral arms to the lens supporting elements of mount 3, but also for connecting the bridge of the mount to lenses 1 and so enabling the mount to be folded in the middle.

We claim:

1. A hinge 12 for a spectacle mount 3, useful for connecting a temple 16 of a temple assembly to a lens 1, wherein said temple assembly comprises an endpiece 4 connectable to said lens 1, a temple 16, and said hinge 12 between said endpiece 4 and said temple 16, said temple assembly being made of flexible, permanently deformable wire; said hinge 12 comprising first 17 and second 15 portions independent of and connected in rotary manner to each other; wherein the hinge 12 is formed by bending a corresponding end of each of the end piece 4 and the temple 16; and wherein said first portion 17 of said hinge 12 comprises at least one coil or toroid portion and said second portion 15 of said hinge 12 comprises a group of at least one and a half coils, said group of at least one and one half coils of said second portion 15 engaging in relatively rotating manner said at least one coil or toroid portion of the first portion 17 in the form of a screw-nut-screw connection; and wherein said at least one coil or toroid portion 17 comprises a first stop means 18 cooperating with said temple 16 to arrest said temple 16 in a closed position 19 substantially parallel to said lens 1.

2. A hinge as claimed in claim 1, wherein said at least one coil or toroid portion 17 is defined by a bent end of a branch 6 of said endpiece 4, and winds about an angle of over 180° and preferably of 270°.

3. A hinge as claimed in claim 1, wherein said first stop means comprises a wire portion 18 positioned crosswise to a branch 6 of said endpiece 4 and located at the end of said at least one coil or toroid portion 17 opposite said branch 6.

4. A hinge as claimed in claim 3, wherein said wire portion 18 extends obliquely towards said branch 6 of said endpiece 4, and, even though extending straight, projects with play from, without interfering with, said branch 6.

5. A hinge as claimed in claim 1, wherein said first portion 17 of said hinge 12 comprises a partially open coil formed with substantially the same pitch and winding direction as said coils in said group of coils of said second portion 15 of said hinge 12.

6. A hinge as claimed in claim 5, wherein said partially open coil 17 is sized so as to frictionally engage an outer helical groove 22 between two adjacent coils 15*a*, 15*b* of said group of coils of said second portion 15 of said hinge 12.

7. A hinge as claimed in claim 1, wherein said group of coils of said second portion 15 of said hinge 12 comprises second stop means 21 cooperating with a branch 6 of said endpiece 4 to arrest said temple 16 in an open position 23 rotated about 90° with respect to said lens 1.

8. A hinge as claimed in claim 7, wherein said second stop means 21 comprises a straight wire portion substantially parallel to the corresponding temple 16 and extending from the end of said coils of said second portion 15 of said hinge 12 opposite said temple 16.

9. Spectacles comprising at least two lenses (1) and a mount 3 for supporting said lenses 1; said mount 3 comprising a pair of temple assemblies, each temple assembly comprising an endpiece 4 engageable with one of said lenses 1, a temple 16, and a hinge 12 between said temple 16 and said endpiece 4, each said temple 16 rotating on said hinge 12, and each hinge 12 comprising first 17 and second 15 portions independent of and connected in rotary manner to each other; wherein:

said first portion 17 of said hinge 12 comprises at least one coil or toroid portion, and said second portion 15 of said hinge 12 comprises a group of at least one and a half coils, wherein said group of coils of said second portion 15 engages in relatively rotating manner said at least one coil or toroid portion of the first portion 17; and each said endpiece 4 is affixed to a respective lens 1, said endpiece comprising a straight first branch 5 and a straight second branch 6 which branches are parallel to each other; said branches 5, 6 being integral with a curved wire portion 7; said first branch 5 of said endpiece 4 engaging a through hole 8 adjacent an outer edge 9 of said lens; said curved portion 7 of said endpiece 4 defining a front stop for keeping said lens affixed to said mount; said second branch 6 of said endpiece 4 being integral with said coil or toroid portion 17 of said hinge 12; and said first and second branches 5, 6 and said curved portion 7 of said endpiece 4 and said coil or toroid portion 17 being located substantially in parallel planes.

\* \* \* \* \*